United States Patent
Wang et al.

(10) Patent No.: US 9,473,989 B2
(45) Date of Patent: Oct. 18, 2016

(54) METHOD AND APPARATUS FOR ASSIGNING SLOT

(71) Applicant: FUJITSU LIMITED, Kawasaki-shi, Kanagawa (JP)

(72) Inventors: Hao Wang, Beijing (CN); Xiaojing Fan, Beijing (CN); Yi Xu, Beijing (CN); Longteng Yi, Beijing (CN); Jun Tian, Beijing (CN); Taiji Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 14/481,702

(22) Filed: Sep. 9, 2014

(65) Prior Publication Data

US 2015/0071279 A1 Mar. 12, 2015

(30) Foreign Application Priority Data

Sep. 10, 2013 (CN) .......................... 2013 1 0409857

(51) Int. Cl.
*H04B 7/212* (2006.01)
*H04W 28/26* (2009.01)
*H04W 12/06* (2009.01)
*H04W 84/18* (2009.01)

(52) U.S. Cl.
CPC ............ *H04W 28/26* (2013.01); *H04W 12/06* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2005/0169221 A1* | 8/2005 | Bennett | H04W 74/0841 370/338 |
| 2005/0243794 A1* | 11/2005 | Yoon | H04W 74/04 370/347 |
| 2005/0259617 A1* | 11/2005 | Wason | H04W 74/002 370/329 |
| 2007/0211686 A1* | 9/2007 | Belcea | H04L 12/24 370/345 |
| 2009/0003289 A1* | 1/2009 | Sugaya | H04W 56/002 370/336 |
| 2009/0154398 A1* | 6/2009 | Isozu | H04W 84/18 370/328 |
| 2009/0313330 A1* | 12/2009 | Sakamoto | H04N 21/2402 709/204 |
| 2015/0071158 A1* | 3/2015 | Fan | H04W 72/0446 370/312 |
| 2015/0071218 A1* | 3/2015 | Xu | H04W 74/002 370/329 |

* cited by examiner

*Primary Examiner* — Otis L Thompson, Jr.
(74) *Attorney, Agent, or Firm* — Arent Fox LLP

(57) ABSTRACT

A method and apparatus for assigning a slot, including: constructing a HELLO packet, the packet including slot request information of a local node and/or slot request information of a neighbor node of the local node; and transmitting the packet, so that a node receiving the packet authenticates a reservation slot requested by a sender; wherein the slot request information of the local node includes an address of the local node and of a receiving node of a data packet to be transmitted and an index of the reservation slot requested by the local node; and the slot request information of the neighbor node includes an address of the neighbor node, an address of a receiving node of a data packet to be transmitted, an index of a reservation slot requested by the neighbor node, and confirmation information of the reservation slot requested by the neighbor node.

20 Claims, 7 Drawing Sheets

METHOD AND APPARATUS FOR ASSIGNING SLOT

CROSS-REFERENCE TO RELATED APPLICATIONS

This application is based upon and claims the benefit of priority to Chinese Patent Application No. 201310409857.4, filed Sep. 10, 2013. The disclosure of the prior application of which is hereby incorporated in its entirety by reference.

TECHNICAL FIELD

The present invention relates to the fields of wireless communications, ad hoc network and smart power network, and in particular to a method and apparatus for assigning slot.

BACKGROUND ART

An MAC (media access control) layer protocol is designed to guarantee radio resources, such as a slot, a frequency channel, and a spreading code, etc., to a specific transmitter in a network. And for an ad hoc network, such guarantee is provided by handshake or negotiation due to the lack of central management.

Carrier sensing multiple access (CSMA) is the most popular in the MAC layer protocol. Each potential transmitter node must sense the state of a channel before actually transmitting a packet to a network. Collision may happen when the sensing fails to reflect the actual state of the channel, which is referred to as a hidden terminal problem. For a large-scale network where a large number of nodes attempt to transmit packets at the same time, the problem will become very serious. This will result in degradation of quality of service, thereby being unable to satisfy application demands.

Time division multiple access (TDMA) provides an alternative scheme for the MAC layer protocol, in which exclusive time slots are reserved for transmission, so as to guarantee higher quality of service. In IEEE (Institute of Electrical and Electronics Engineers) 802.15.4 specification, a portion of a superframe, which is referred to as a collision free period (CFP), is divided for TDMA transmission. And a minimum disposable unit in such period is referred to as a guaranteed time slot (GTS).

However, the IEEE 802.15.4 specification, only provides a basic GTS scheduling mechanism for the network in a star topology, which cannot support slot assignment in other sophisticated type of network, especially in the large-scale network and in ad hoc mode.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

A main object of embodiments of the present invention is to provide a method and apparatus for assigning slot, so as to solve the problem mentioned in the Background Art.

According to a first aspect of the embodiments of the present invention, there is provided a node in a multi-hop network, including:

a constructing unit configured to construct a HELLO packet, the HELLO packet including slot request information of a local node or including slot request information of a local node and slot request information of at least one neighbor node of the local node; and a transmitting unit configured to transmit the HELLO packet, so that a node receiving the HELLO packet authenticates a reservation slot requested by the node according to the slot request information;

wherein the slot request information of the local node includes an address of the local node, an address of a receiving node of a data packet to be transmitted by the local node and an index of a reservation slot requested by the local node; and the slot request information of the neighbor node includes an address of the neighbor node, an address of a receiving node of a data packet to be transmitted by the neighbor node, an index of a reservation slot requested by the neighbor node, and confirmation information of the reservation slot requested by the neighbor node.

According to a second aspect of the embodiments of the present invention, there is provided a method for assigning slot, including:

constructing a HELLO packet, the HELLO packet including slot request information of a local node or including slot request information of a local node and slot request information of at least one neighbor node of the local node; and transmitting the HELLO packet, so that a node receiving the HELLO packet authenticates a reservation slot requested by a sender of the HELLO packet according to the slot request information;

wherein, the slot request information of the local node includes an address of the local node, an address of a receiving node of a data packet to be transmitted by the local node and an index of the reservation slot requested by the local node; and the slot request information of the neighbor node includes an address of the neighbor node, an address of a receiving node of a data packet to be transmitted by the neighbor node, an index of a reservation slot requested by the neighbor node, and confirmation information of the reservation slot requested by the neighbor node.

The advantage of the embodiments of the present invention resides in that with the method and apparatus of the embodiments of the present invention, a scheme for assigning slot which is applicable to a multi-hop ad hoc network, completely consistent with existing routing protocols and the IEEE 802.15.4 specification and based on a HELLO packet, is provided, which solves the problem of data collision mentioned in the Background Art, and supports ad hoc application of relatively high service quality.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more other drawings or embodiments. Moreover, in the drawings, like reference numerals designate corresponding parts in several drawings and may be used to designate like or similar parts in more than one embodiment.

In the drawings.

DETAILED DESCRIPTION

Foregoing and other features of the embodiments of the present invention will become apparent through the following description with reference to the accompanying drawings. These embodiments are illustrative only and are not intended to limit the present invention.

For easy understanding of the principle and embodiments of the present invention by those skilled in the art, the embodiments of the present invention shall be described taking an ad hoc network as an example. However, it should be understood that the present invention is not limited thereto, and is applicable to other multi-hop networks, such as wireless communications, and a smart power grid, etc.

Figure 1:
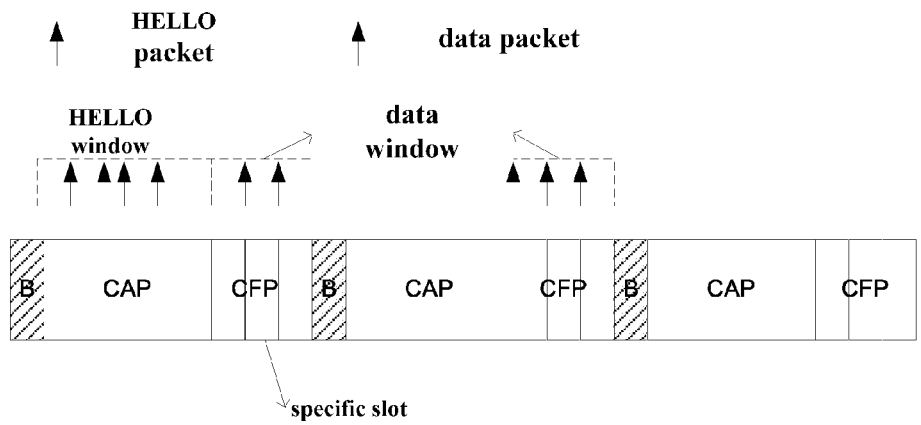
FIG. 1 is a schematic diagram of transmission of a HELLO packet and a data packet in time domain in a distributed manner.

In the embodiments of the present invention, slot assignment is performed in a distributed manner, thereby facilitating implementation of an ad hoc network. A process of the slot assignment involves one type of control packet, that is, a HELLO packet, which is a broadcasting packet and usually used in a route protocol. In order to reserve valid resource for data packet transmission, the control packet should be transmitted separately. In other words, the data packet and the control packet should be transmitted in different frequencies or time slots or in other types of channels. An example showing separate transmission in time for IEEE 802.15.4 system is depicted in FIG. 1.

Figure 2:
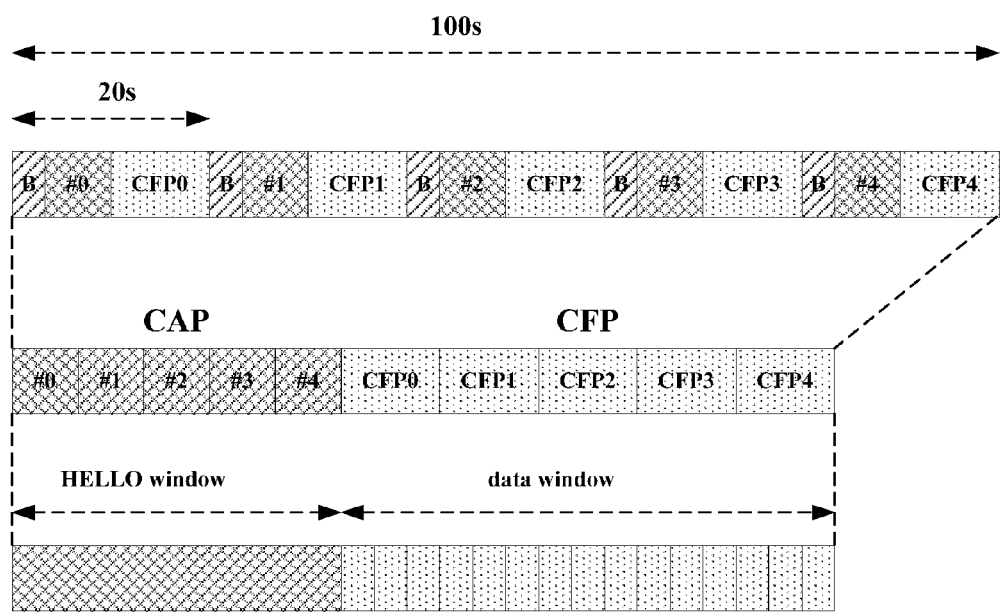
FIG. 2 is a schematic diagram of a frame structure in which a superframe being divided into five groups.

The slot allocation process is done by exchange of control packets, i.e. HELLO packet, each node sends and receives HELLO packet to reserve valid slots for data transmission and to avoid collision. In order to ensure flexibility and efficiency of the assignment, the HELLO packets transmitted in a CAP are not necessarily used for reserving slots in the same superframe, and these HELLO packets may also be used for reserving slots in former or subsequent superframes. In some cases, a certain number of superframes may be grouped to expand the scale of the network. This means that HELLO packet transmitted in any one (CAP) of the superframes is allowed to be used for reserving any slots in these superframes (CFP). FIG. 2 is an example of superframes in one group with the number being set as 5.

The HELLO packets are periodically broadcasted to declare the occupation of specific slots in order to keep other nodes from using the same slots for data transmission, and the period may be in accordance with the application requirement. For a static network, such as a smart grid, location of node is barely changed so longer period may be accepted.

In the embodiments of the present invention, an HELLO packet may be divided into two parts, the first part is referred to as an REQ part, indicating a reservation slot requested by a sender of the HELLO packet, i.e. slot request information of a local node, and the second part is referred to as an RES part, indicating a response to a request of a neighbor node, i.e. slot request information of at least one neighbor node of the local node, corresponding to each neighbor node, a response to a request of the neighbor node being contained.

In the second part of the HELLO packet, each response contains at least four segments, local source ID, local destination ID, a slot index, and confirmation information. The local source ID represents a transmitter address of a data packet, and represents ID of a transmitter of an HELLO packet if the HELLO packet is used for reserving a slot for itself. The local destination ID represents a receiver address of the data packet, refers to an address of the next hop in a multi-hop network, and refers to ID of a parent node if the network is of tree topology. The slot index represents a preferred slot expected to be reserved by the local source, which is selected based on observation on selection of the neighbor node extracted from the HELLO packet transmitted by the neighbor node. And the confirmation information is feedback from a neighbor node, which indicates via consent or objection whether the local source is able to reserve its preferred slot; and once an HELLO packet is received and if the local source ID equals to the ID of a transmitter of the HELLO packet, each node may determine a value of the confirmation information. The first part of an HELLO packet includes only the former three segments, which are, local source ID, local destination ID and a slot index respectively.

Figures 3, 4:
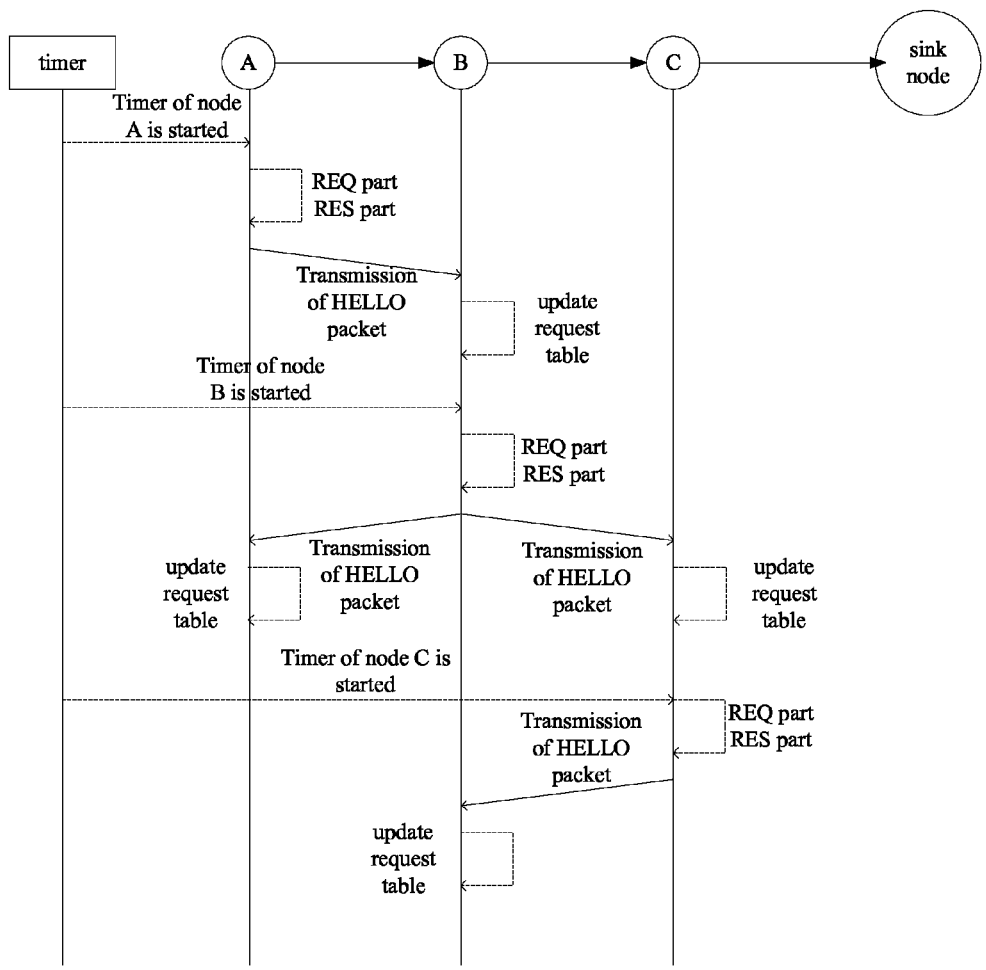
FIG. 3 is a schematic diagram of a mode of implementation of a format of a HELLO packet.
FIG. 4 is an integral flowchart of transmission and receiving of a HELLO packet.

A format of an HELLO packet is shown in FIG. 3.

In the embodiments of the present invention, in order to record a reservation of a neighbor node and track the state update in each slot, each node needs to maintain a local table, the local table containing multiple entries, and each entry at least including four segments identical to an RES part of a received HELLO packet, that is, local source ID, local destination ID, a slot index, and confirmation information. Table 1 shows an example of the local table, which is referred to as a local request table or a request table in this embodiment.

TABLE 1

| Local source ID | Local destination ID | Slot inde | Confirmation |
|---|---|---|---|
| A | B | 1 | 1 |
| C | D | 1 | 0 |
| E | F | 4 | 1 |

In the embodiments of the present invention, a process of exchange of HELLO packets is shown in FIG. 4. Transmission of HELLO packets is scheduled by a local timer. When the local timer is started, a transmission node of an HELLO packet determines contents of the above two parts of a HELLO packet and constructs the HELLO packet. Once receiving the HELLO packet, a receiving node of the HELLO packet, based on local observation, such as a local request table, observes and determines a confirmation value related to the REQ part in the HELLO packet, that is, whether consenting to the reservation slot requested by the transmission node of the HELLO packet. Furthermore, all information retrieved from the HELLO packet should be used for updating the local request table.

In the embodiments of the present invention, each node further preserves a previously reserved slot, which is referred to as reservation history information and contains a slot index and state, for reference for selecting an idle slot in constructing a HELLO packet at the next time.

In the embodiments of the present invention, in a process of transmission of a HELLO packet, a node needs to find an available idle slot to construct the REQ part of its HELLO packet, and find appropriate information from the request table to construct the RES part of its HELLO packet. The method and apparatus for assigning slot of the embodiments of the present invention shall be described below in detail with reference to the accompanying drawings and particular embodiments.

Embodiment 1

Figure 5:
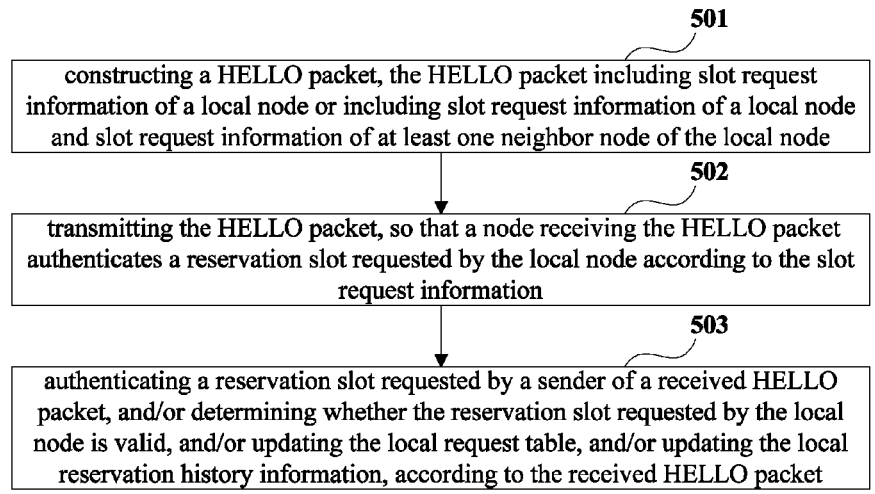
FIG. 5 is a flowchart of a method for assigning slot of an embodiment of the present invention.

An embodiment of the present invention provides a method for assigning slot, applicable to a node in a multi-hop network. FIG. 5 is a flowchart of the method. Referring to FIG. 5, the method includes:

step 501: constructing a HELLO packet, the HELLO packet including slot request information of a local node or including slot request information of a local node and slot request information of at least one neighbor node of the local node; and step 502: transmitting the HELLO packet, so that a node receiving the HELLO packet authenticates a reservation slot requested by the local node according to the slot request information;

wherein, the slot request information of the local node includes an address of the local node, an address of a receiving node of a data packet to be transmitted by the local node and an index of the reservation slot requested by the local node; and the slot request information of the neighbor node includes an address of the neighbor node, an address of a receiving node of a data packet to be transmitted by the neighbor node, an index of a reservation slot requested by the neighbor node, and confirmation information of the reservation slot requested by the neighbor node.

In this embodiment, as described above, the slot request information of the local node (also referred to as a local) is referred to as an REQ part of a HELLO packet, and the slot request information of a neighbor node is referred to as an RES part. Wherein, the REQ part indicates a reservation slot requested by an HELLO sender (a transmission node of an HELLO packet, briefly referred to as a transmission node or a sender of a HELLO packet) for a data packet to be transmitted by it, and the RES part indicates reservation slots requested by neighbor nodes of the HELLO sender for their data packets and confirmation information of the requested reservation slots.

FIG. 3 is a schematic diagram of a format of one implementation mode of the HELLO packet. Referring to FIG. 3, for the REQ part of the HELLO packet, the local source ID is an address of the transmission node, i.e. an address of the HELLO sender, the local destination ID is an address of a receiving node, i.e. an address of a receiving node of a data packet to be transmitted by the HELLO sender, and the slot index is an index of the reservation slot (briefly referred to as a reservation slot, the same as follows) requested by the HELLO sender for a data packet to be transmitted by it. The RES part of the HELLO packet contains multiple information entries, each information entry corresponding to a neighbor node of the HELLO sender and containing an address (local source $ID_{1\sim n}$) of the neighbor node, an address (local destination $ID_{1\sim n}$) of a receiving node of a data packet to be transmitted by the neighbor node, an index of a reservation slot (slot $index_{1\sim n}$) requested by the neighbor node for a data packet to be transmitted by it, and confirmation information ($confirmation_{1\sim n}$) of the requested reservation slot.

In this embodiment, in order to reserve a slot via an HELLO packet for the data to be transmitted, an HELLO packet shall be constructed first, which may be as shown in FIG. 3, and contain an REQ part and an RES part, and may also contain an REQ part only and not contain an RES part. For example, for a node reserving a slot via an HELLO packet for the first time, as no slot request information of other neighbor nodes is acquired, the RES part is empty.

Figure 6:
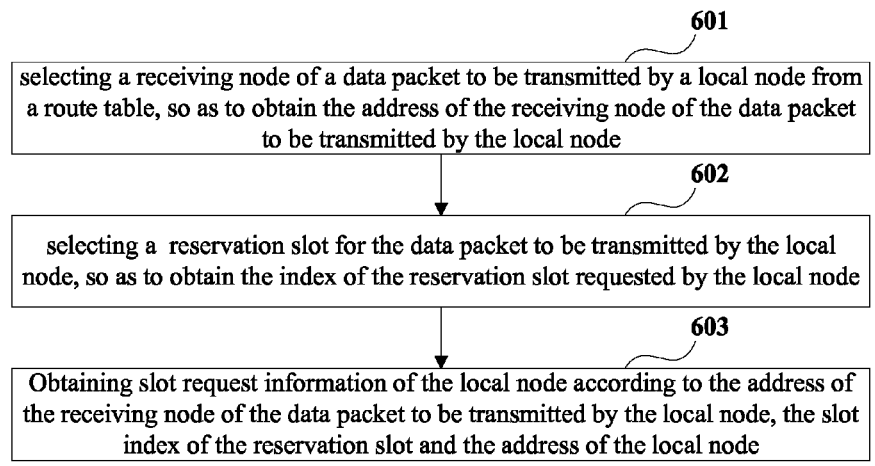
FIG. 6 is a flowchart of constructing an REQ part of a HELLO packet of an embodiment of the present invention.

In this embodiment, the three segments of the REQ part of the HELLO packet may be obtained by using the method shown in FIG. 6. Referring to FIG. 6, the method includes:

step 601: selecting the receiving node of the data packet to be transmitted by the local node from a route table, so as to obtain the address of the receiving node of the data packet to be transmitted by the local node;

in this embodiment, each node maintains a route table, which stores a next hop nodes from the node to a destination node (such as a gateway) and routing costs, as shown in Table 2:

TABLE 2

Figure 7:
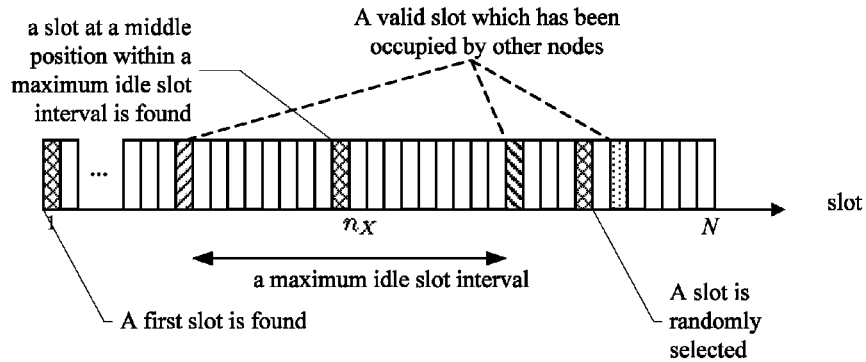
FIG. 7 is a schematic diagram of selecting a reservation slot according to a method of an embodiment of the present invention.

| Structure of a route table | | |
|---|---|---|
| Address of a destination node | Address of a routing node | Routing cost |
| $N_{dest}$ | $N_1$ | $C_1$ |
|  | ... | ... |
|  | $N_n$ | $C_n$ |
| ... | ... | ... | in step 601, a node may select a routing path of minimum routing cost (i.e. the next hop node) for data forwarding, an address of node with the routing path of minimum routing cost being the address of the receiving node;

step 602: selecting the reservation slot for the data packet to be transmitted by the local node, so as to obtain the index of the reservation slot requested by the local node;

in this embodiment, after each time of reserving a slot, each node may temporarily store information on its reservation slot as reservation history information; the information on the reservation slot includes not only the index of the requested reservation slot, but also the state of the requested reservation slot, which is denoted by a flag, the flag identifying whether the reservation slot is valid or not, denoted by "valid" and "invalid" respectively, for example;

in step 602, whether the previously requested reservation slot is valid may be determined according to local reservation history information; if it is valid, the previously requested reservation slot may be taken as a reservation slot requested this time; and if it is invalid, or a slot has not been reserved before, a reservation slot may be selected again;

in this embodiment, an unused slot may be randomly selected from a preconfigured slot set as the reservation slot, as shown in FIG. 7; or a first unused slot may be selected from a preconfigured slot set as the reservation slot, as shown in FIG. 7; or a slot at a middle position within a maximum unused slot interval may be selected from a preconfigured slot set as the reservation slot, as shown in FIG. 7; or a slot with a slot index being a function of the address of the local node may be selected from a preconfigured slot set as the reservation slot, for example, a function $s_i=f(ID_i)=ID_i$ mod K, where, $s_i$ denotes an index of a slot assigned for a node i, $ID_i$ denotes ID of the node i, and K denotes a total number of available slots; or an unused slot may be selected from a slot set to which a hop count of the local node corresponds as the reservation slot according to the hop count of the local node;

wherein, the preconfigured slot set may be a data part of a designated frame in a preset HELLO packet interval, and may also be data parts of all frames in a preset HELLO packet interval, and this embodiment is not limited thereto; wherein, preferably, an interval between the designated frame and the frame where the HELLO packet is located is ⅔ or ⅘ of the HELLO packet interval;

wherein, Table 3 shows a storing table of corresponding relationship between the hop count of the local node and the slot set of one implementation mode of this embodiment; however, this embodiment is not limited thereto;

TABLE 3

| Hop count (i) | Available slot set ($k_i$) |
| --- | --- |
| 8 | 1, 2, 3, . . . 8 |
| 7 | 1, 2, 3, . . . 16 |
| 6 | 1, 2, 3, . . . 32 |
| 5 | 1, 2, 3, . . . 64 |
| 4 | 1, 2, 3, . . . 128 |
| 3 | 1, 2, 3, . . . 256 |
| 2 | 1, 2, 3, . . . 512 |
| 1 | 1, 2, 3, . . . 1024 | step 603: obtaining slot request information of the local node according to the address of the receiving node of the data packet to be transmitted by the local node, the slot index of the reservation slot and the address of the local node;

wherein, after obtaining the address of the receiving node of the data packet and the index of the requested reservation slot respectively via steps 601 and 602, in combination with the address of the local node, contents constructing the REQ part of the HELLO packet may be obtained, i.e. the slot request information of the local node;

in this embodiment, an information entry of the REQ part of the HELLO packet may be selected from a local request table according to a predetermined policy;

in this embodiment, each node further maintains a local request table (briefly referred to as a request table), which is as shown in Table 1, and its description is omitted herein.

In an implementation mode of this embodiment, as shown in Table 1, when the confirmation information is "1", it denotes "consent", that is, a reservation slot may be used; for example, a node A may send a data packet to a node B by using a slot of a slot index "1"; for another example, a node E may send a data packet to a node F by using a slot of a slot index "4"; and when the confirmation information is "0", it denotes "objection", that is, although the slot is reserved, it may not be used; for example, a node C may not send a data packet to a node D by using a slot of a slot index "1".

In this embodiment, information entries in the request table are constructed and updated according to the received HELLO packet, which shall be described below in detail.

In an implementation mode, the node does not receive a HELLO packet, for example, in an initial process, and there is no information entry in the request table at this moment, the HELLO packet constructed by the node includes only the REQ part, but does not include the RES part.

In another implementation mode, the request table is non-empty, the node may select part information entries from the request table according to a predetermined policy, and take them as information entries of the RES part of the HELLO packet.

Wherein, the predetermined policy may be selecting an entry with transmission node being the one-hop neighbor node of the local node from the local request table, and taking it as the RES part of the HELLO packet, may be selecting an entry with receiving node being the one-hop neighbor node of the local node from the local request table, and taking it as the RES part of the HELLO packet, and may also be selecting an entry with transmission node and receiving node both being one-hop neighbor node of the local node from the local request table, and taking it as the RES part of the HELLO packet. What is described above is examples only, and this embodiment is not limited thereto.

Figure 8:
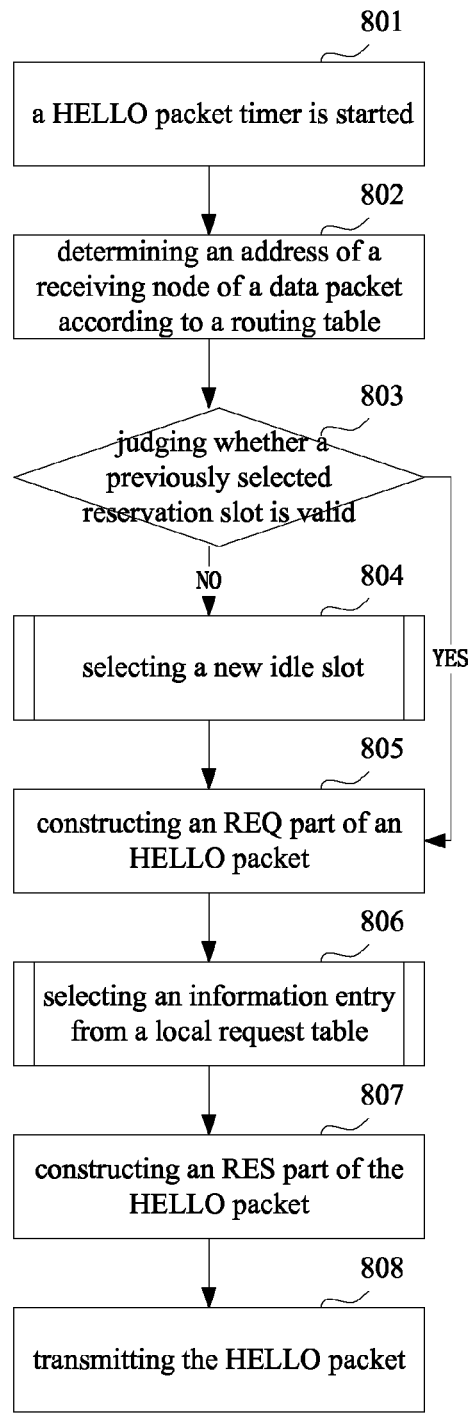
FIG. 8 is a flowchart of constructing and transmitting a HELLO packet according to a method of an embodiment of the present invention.

FIG. 8 is a flowchart of constructing and transmitting a HELLO packet according to the method of an embodiment of the present invention. As shown in FIG. 8, the flow includes:

step 801: a HELLO packet timer is started;

step 802: determining an address of a receiving node of a data packet according to a routing table;

step 803: judging whether a previous selected slot is valid, executing step 805 if it is valid, and executing step 804 if it is invalid;

step 804: selecting a new idle slot;

wherein, there exist many manners of selection, which are as described above, and shall not be described herein any further;

step 805: constructing an REQ part of an HELLO packet;

step 806: selecting an information entry from a local request table;

wherein, there exist many manners of selection, which are as described above, and shall not be described herein any further;

step 807: constructing an RES part of the HELLO packet; and step 808: transmitting the HELLO packet.

In this embodiment, a neighbor node may receive the HELLO packet after each node transmits the HELLO packet according to the method of this embodiment, since the HELLO packet is transmitted in a broadcast manner. As the HELLO packet contains slot request information of the transmission node of the HELLO packet and slot request information of a neighbor node of the transmission node of the HELLO packet, the node receiving the HELLO packet may authenticate the reservation slot requested by the transmission node of the HELLO packet according to the slot request information, or update its local request table according to the slot request information, or update its local request table according to the slot request information and determine whether a reservation slot requested by itself before is valid (since the slot request information of itself may be in the RES part of the HELLO packet), so as to perform slot reservation according to the method of this embodiment (as described above, constructing and transmitting its HELLO packet according to the method of this embodiment).

Therefore, in this embodiment, as shown in FIG. 5, the method may further includes:

step 503: authenticating a reservation slot requested by a sender of a received HELLO packet, and/or determining whether the reservation slot requested by the local node is valid, and/or updating the local request table, and/or updating the local reservation history information, according to the received HELLO packet.

Figure 9:
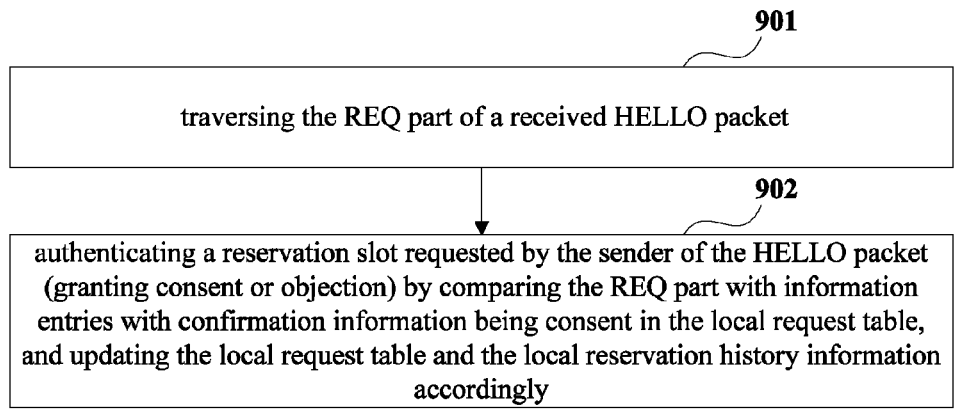
FIG. 9 is a flowchart of a mode of implementation of processing a received HELLO packet.

In an implementation mode of this embodiment, if the received HELLO packet contains only the slot request information of the sender of the HELLO packet, that is, containing only the RES part, step 503 may be executed by using the method shown in FIG. 9. As shown in FIG. 9, the method includes:

step 901: traversing the REQ part of the received HELLO packet; and step 902: authenticating the reservation slot requested by the sender of the HELLO packet (granting consent or objection) by comparing the REQ part with information entries with confirmation information being consent in the local request table, and updating the local request table and the local reservation history information accordingly.

In particular, in step 902, if the requested reservation slot indicated by the REQ part does not collide with the requested reservation slots indicated by the entries with confirmation information being consent in the local request table, grant consent to the reservation slot requested by the sender of the received HELLO packet, otherwise, grant objection to the reservation slot requested by the sender of the received HELLO packet. Wherein, after authenticating the reservation slot requested by the sender of the received HELLO packet, the local request table and the local reservation history information will be updated accordingly, so as to be ready for the next time of transmitting or receiving a HELLO packet.

Wherein, as described above, in the case where the requested reservation slot indicated by the REQ part does not collide with the requested reservation slots indicated by the entries with confirmation information being consent in the local request table, an entry corresponding to the REQ part is added into the local request table; wherein, confirmation information to which the newly added entry corresponds is consent. Furthermore, whether the requested reservation slot indicated by the REQ part collides with the locally requested reservation slot indicated by the local reservation history information may be judged; if they collide, it is determined that the locally requested reservation slot is invalid, and the local reservation history information is modified accordingly, such as modifying a flag indicating the state into being invalid, or modifying a slot index into a specific value, etc.; and if they do not collide, the local reservation history information is kept unchanged.

Wherein, as described above, in the case where the requested reservation slot indicated by the REQ part collides with the requested reservation slots indicated by the entries with confirmation information being consent in the local request table, an entry corresponding to the REQ part is added into the local request table; wherein, confirmation information to which the newly added entry corresponds is objection.

In this embodiment, alternatively, before step 902, whether the REQ part has been received may be determined first; if yes, it shows that the REQ part has been processed, the REQ part is old, at this moment, ending the process directly; if no, it shows the REQ part has not been processed, the REQ part is new, at this moment, step 902 is executed.

In this embodiment, alternatively, before step 902, whether the REQ part is valid may be determined; for example, whether the REQ part is valid is determined by judging whether an index of the requested reservation slot indicated by the REQ part is greater than 0; if yes, it shows that the sender of the HELLO packet requests a valid reservation slot, and step 902 is executed; and if no, it shows that the sender of the HELLO packet requests an invalid reservation slot, or, in other words, the sender of the HELLO packet does not want to reserve slot, and at this moment, an entry corresponding to the REQ part may be added into the local request table directly; wherein, confirmation information to which the newly added entry corresponds may be of a specific value.

With the method shown in FIG. 9, the reservation slot requested by the sender of the HELLO packet may be authenticated, and the local request table and the local reservation history information may be updated accordingly.

Figure 10:
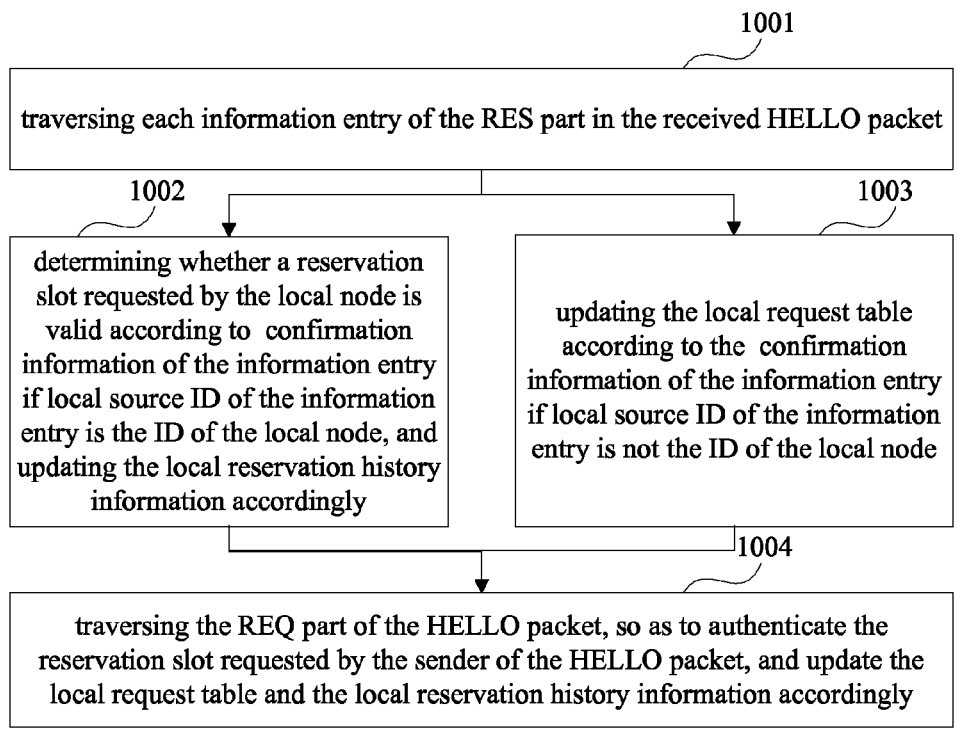
FIG. 10 is a flowchart of another mode of implementation of processing a received HELLO packet.

In another implementation mode of this embodiment, if the received HELLO packet contains both the slot request information of the sender of the HELLO packet, i.e. the REQ part, and the slot request information of at least one neighbor node of the sender of the HELLO packet, i.e. the RES part, step 503 may be executed by using the method shown in FIG. 10. As shown in FIG. 10, the method includes:

step 1001: traversing slot request information of each neighbor node in the slot request information of the at least one neighbor node of the sender of the received HELLO packet in the received HELLO packet, that is, traversing each information entry of the RES part in the received HELLO packet;

step 1002: determining whether the reservation slot requested by the local node is valid according to confirmation information of the information entry if local source ID of the information entry is the ID of the local node, and updating the local reservation history information accordingly;

wherein, if the confirmation information of the information entry is consent, it is determined that the reservation slot requested by the local node is valid, and at this moment, the local reservation history information may be kept unchanged; and if the confirmation information of the information entry is objection, it is determined that the reservation slot requested by the local node is invalid, and at this moment, the local reservation history information may be updated, such as modifying the state of the requested reservation slot in the local reservation history information into being invalid, or modifying an index of the requested reservation slot in the local reservation history information into a specific value, etc.;

step 1003: updating the local request table according to the confirmation information of the information entry if local source ID of the information entry is not the ID of the local node;

wherein, if the confirmation information of the information entry is objection, the local request table is directly updated accordingly, such as adding an entry corresponding to the information entry into the local request table, or modifying an entry corresponding to the information entry in the local request table; and if the confirmation information of the information entry is consent, whether the local source ID of the information entry is the ID of one-hop neighbor node of the local node is judged; if yes, the local request table is directly updated accordingly, such as adding an entry corresponding to the information entry into the local request table, or modifying an entry corresponding to the information entry in the local request table; and if no, confirmation information to which an information entry of one-hop neighbor node of the local node in the local request table is updated accordingly; for example, if the slots occupied by the two are identical and the corresponding confirmation information in the local request table is consent, the corresponding entry in the local request table is modified into objection, and if the slots occupied by the two are identical and the corresponding confirmation information in the local request table is objection or the slots occupied by the two are different, the corresponding entry in the local request table is kept unchanged;

step 1004: traversing the REQ part of the HELLO packet, so as to authenticate the reservation slot requested by the sender of the HELLO packet, and update the local request table and the local reservation history information accordingly;

wherein, this step may be executed by using the method shown in FIG. 9, the contents of which being incorporated herein, and being not going to be described herein any further.

In this implementation mode, similar to the method shown in FIG. 9, alternatively, before step 1002, whether the information entry has been received may be determined first; if yes, it shows that it has been processed before, and this information entry is old, and at this moment, a next information entry of the RES part is acquired; and if no, it shows that it has not been processed before, and this information entry is new, and at this moment, step 1002 is executed.

With the method shown in FIG. 10, whether the reservation slot requested by the local node is valid may be determined according to the information entry of local source ID being the ID of the local node in the RES part, and the local request table may be updated according to other information entries in the RES part; furthermore, the reservation slot requested by the sender of the HELLO packet may be authenticated according to the REQ part, and the local request table and the local reservation history information may be updated accordingly.

Figure 11:
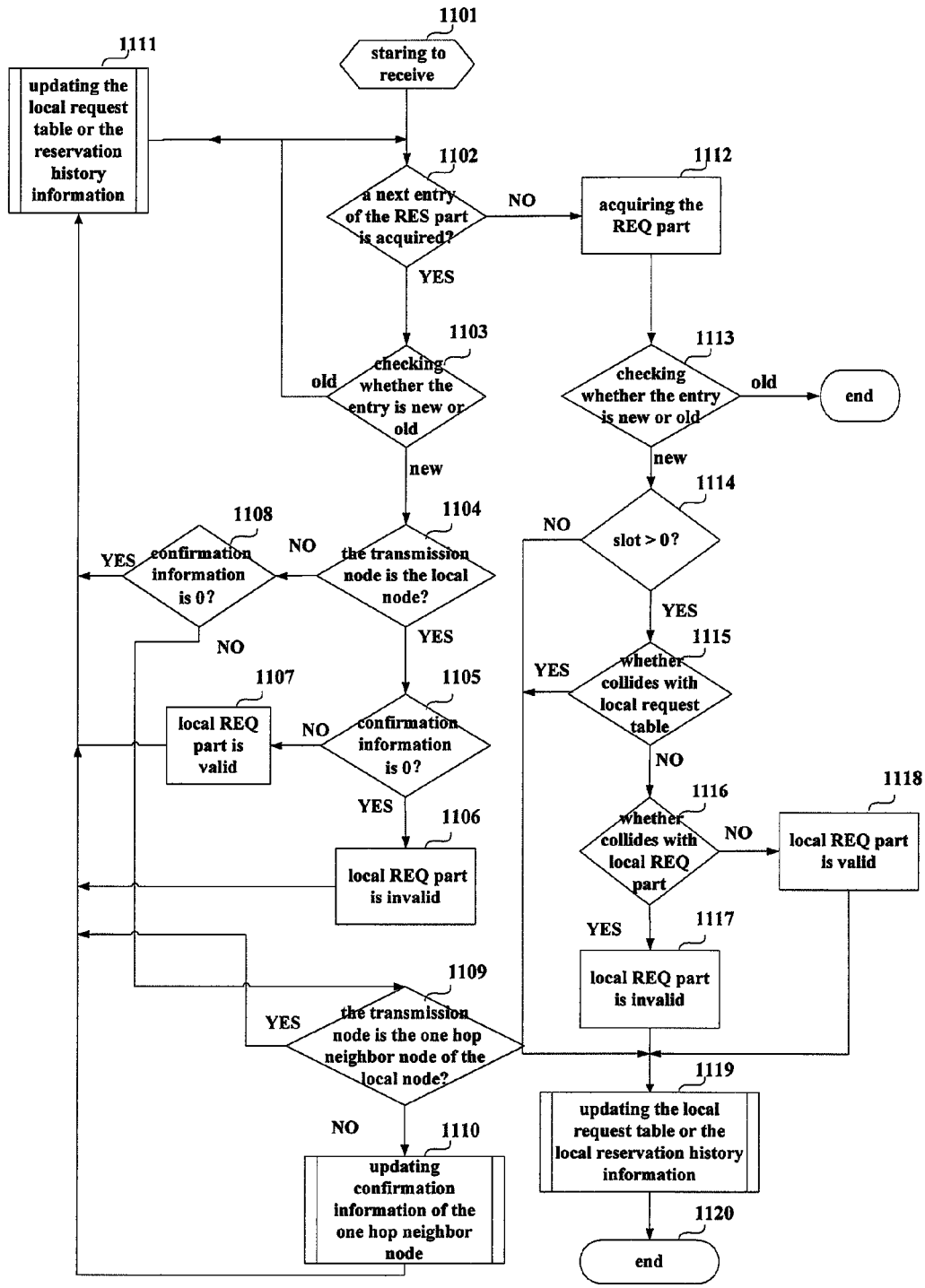
FIG. 11 is a flowchart of receiving a HELLO packet according to a method of an embodiment of the present invention.

FIG. 11 is a flowchart of processing a received HELLO packet according to the method of the embodiment of the present invention. Referring to FIG. 11, the flow includes:

step 1101: staring to receive;

step 1102: whether a next entry of the RES part is acquired, executing step 1103 if yes, and executing step 1112 if no;

wherein, after traversing each entry of the RES part, step 1112 is executed to process the REQ part of the HELLO packet;

step 1103: checking whether the entry is new or old, and executing step 1104 if it is new, otherwise, turning back to step 1102;

step 1104: whether an address of a transmission node of the entry is a local address, executing step 1105 if yes, otherwise, executing step 1108;

step 1105: whether confirmation information of the entry is 0, executing step 1106 if yes, otherwise, executing step 1107;

step 1106: determining that the locally requested slot is valid, and executing step 1111 to keep the local reservation history information unchanged;

step 1107: determining that the locally requested slot is invalid, and executing step 1111 to update the local reservation history information;

step 1108: whether the confirmation information of the entry is 0, if yes, executing step 1111 to update the local request table, otherwise, executing step 1109;

wherein, as described above, the entry may be added into the local request table;

step 1109: whether the address of the transmission node of the entry is an address of a one-hop neighbor node of the local node, executing step 1111 to update the local request table if yes, otherwise, executing step 1110;

wherein, as described above, the entry may be added into the local request table;

step 1110: updating confirmation information of the one-hop neighbor node of the local node;

wherein, whether to update the confirmation information of the one-hop neighbor node of the local node may be determined by slot comparison;

step 1111: updating the local request table or the local reservation history information;

wherein, contents of the local request table or the local reservation history information to be updated are different according to different results of judgment; details are as described above, which shall not be described herein any further;

step 1112: acquiring the REQ part of the HELLO packet;

step 1113: checking whether the entry is new or old, and executing step 1114 if it is new, otherwise, ending the process;

step 1114: checking whether the slot to which the entry corresponds is greater than 0, executing step 1115 if yes, otherwise, executing step 1119 to update the local request table;

wherein, if the slot is greater than 0, it shows that the transmission node of the HELLO packet requests a valid slot, and at this moment, subsequent processing may be performed to the requested slot; otherwise, it shows that the transmission node of the HELLO packet does not request a valid slot, and in this case, the local request table may be updated directly; for example, adding the entry (the REQ part of the HELLO packet) into the local request table;

step 1115: judging whether the entry collides with the local request table, if yes, executing step 1119 to update the local request table, otherwise, executing step 1116;

wherein, if it collides with the local request table, as the slot requested by the REQ part of the HELLO packet has been occupied/reserved by the transmission node of the HELLO packet, the reservation slot requested by the REQ part of the HELLO packet is granted objection, and the local request table is updated accordingly;

and wherein, if it does not collide with the local request table, the sender of the HELLO packet may use the reservation slot requested by it, and the reservation slot requested by the REQ part of the HELLO packet is granted consent, and the local request table is updated accordingly;

step 1116: judging whether the entry collides with the locally requested slot, if yes, executing step 1117, otherwise, executing step 1118;

wherein, if the reservation slot requested by the sender of the HELLO packet collides with the locally requested slot, the local node will not able to use its requested slot, and the local reservation history information may be updated accordingly, which is as described above, and shall not be described herein any further; otherwise, the local node may use the slot requested by it;

step 1117: determining that the locally requested slot is invalid, and executing step 1119 to update the local reservation history information;

step 1118: determining that the locally requested slot is valid, and executing step 1119 to keep the local reservation history information unchanged;

step 1119: updating the local request table or the local reservation history information;

wherein, contents of the local request table or the local reservation history information to be updated are different according to different results of judgment; details are as described above, which shall not be described herein any further;

step 1120: ending.

With the method of the embodiment of the present invention, when a timer of a HELLO packet is started, the node constructs a HELLO packet including a REQ part (slot information requested by itself) or including a REQ part (slot information requested by itself) and a RES part (slot information requested by a neighbor node of itself), and transmits the HELLO packet in a broadcast manner, so that a node receiving the HELLO packet accordingly determines whether a reservation slot requested by it is valid, and/or updates its local request table, and/or authenticates a reservation slot requested by the sender of the HELLO packet, etc., thereby effectively achieving efficient assignment of slots, avoiding data collision, and being more applicable to various multi-hop networks.

An embodiment of the present invention further provides a node in a multi-hop network, as described in Embodiment 2 below. As the principle of the node for solving problems is similar to that of the method in Embodiment 1, the implementation of the method may be referred to for the implementation of the node, and the repeated parts shall not be described any further.

Embodiment 2

Figure 12:
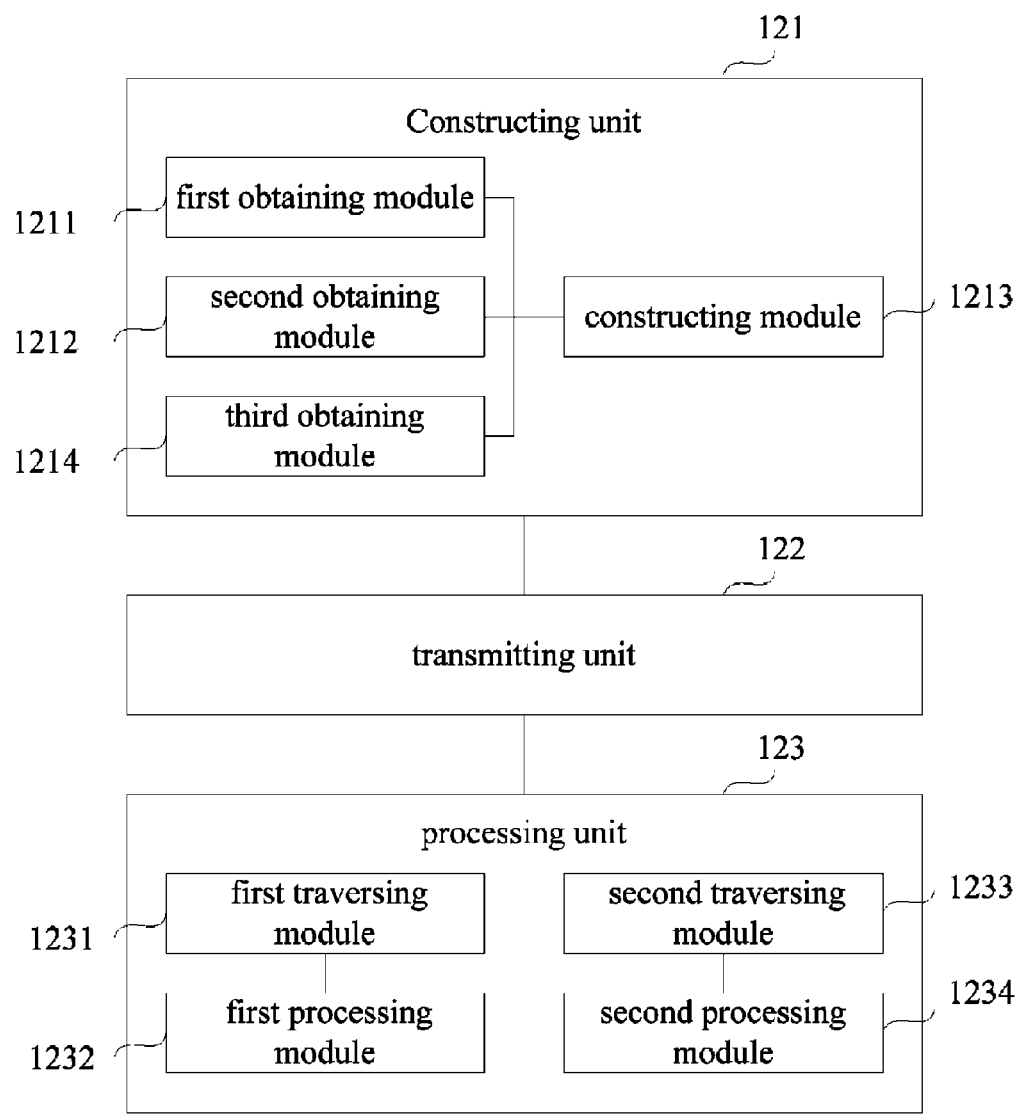
FIG. 12 is a schematic diagram of the structure of a node of an embodiment of the present invention.

An embodiment of the present invention further provides a node in a multi-hop network. FIG. 12 is a schematic diagram of the structure of the node. Referring to FIG. 12, the node includes:

a constructing unit 121 configured to construct a HELLO packet, the HELLO packet including slot request information of a local node or including slot request information of a local node and slot request information of at least one neighbor node of the local node; and a transmitting unit 122 configured to transmit the HELLO packet, so that a node receiving the HELLO packet authenticates a reservation slot requested by the local node according to the slot request information;

wherein the slot request information of the local node includes an address of the local node, an address of a receiving node of a data packet to be transmitted by the local node and an index of the reservation slot requested by the local node; and the slot request information of the neighbor node includes an address of the neighbor node, an address of a receiving node of a data packet to be transmitted by the neighbor node, an index of a reservation slot requested by the neighbor node, and confirmation information of the reservation slot requested by the neighbor node.

In an embodiment, the constructing unit 121 includes:

a first obtaining module 1211 configured to obtain the address of the receiving node of the data packet to be transmitted by the local node by selecting the receiving node of the data packet to be transmitted by the local node from a routing table;

a second obtaining module 1212 configured to obtain the index of the reservation slot requested by the local node by selecting the reservation slot for the data packet to be transmitted by the local node; and a constructing module 1213 configured to construct the slot request information of the local node in the HELLO packet according to the address of the receiving node of the data packet to be transmitted by the local node, the index of the reservation slot requested by the local node and the address of the local node.

In an embodiment, the constructing unit 121 further includes:

a third obtaining module 1214 configured to select an information entry of the at least one neighbor node from a local request table according to a predetermined policy and take the information entry as the slot request information of the at least one neighbor node;

and the constructing module 1213 constructs the slot request information of the at least one neighbor node in the HELLO packet according to the slot request information of the at least one neighbor node.

In an embodiment, the second obtaining module 1212 is configured to: take a reservation slot previously requested by the local node as the reservation slot when the reservation slot previously requested by the local node is valid; or, randomly select an unused slot from a preconfigured slot set as the reservation slot, or select a first unused slot from a preconfigured slot set as the reservation slot, or select a slot at a middle position within a maximum unused slot interval from a preconfigured slot set as the reservation slot, or select a slot with a slot index being a function of the address of the local node from a preconfigured slot set as the reservation slot, or select an unused slot from a slot set to which a hop count of the local node corresponds as the reservation slot according to the hop count of the local node, when the slot previously requested by the local node is invalid.

In an embodiment, the node further includes:

a processing unit 123 configured to authenticate a reservation slot requested by a sender of a received HELLO packet, and/or determine whether the reservation slot of the local node is valid, and/or update a local request table, and/or update local reservation history information, according to the received HELLO packet.

In an embodiment, the processing unit 123 includes:

a first traversing module 1231 configured to traverse a REQ part of the HELLO packet, i.e. the slot request information of the sender of the HELLO packet; and a first processing module 1232 configured to authenticate the reservation slot requested by the sender of the HELLO packet by comparing the slot request information of the sender of the HELLO packet with information entries with confirmation information being consent in the local request table, and update the local request table or the local reservation history information accordingly.

Wherein, if a requested reservation slot indicated by the slot request information of the sender of the HELLO packet collides with a requested reservation slot indicated by a information entry with confirmation information being consent in the local request table, the requested reservation slot by the sender of the HELLO packet is granted objection, and the local request table is updated accordingly.

Wherein, if the requested reservation slot indicated by the slot request information of the sender of the HELLO packet does not collide with the requested reservation slots indicated by the information entries with confirmation information being consent in the local request table, the requested reservation slot by the sender of the HELLO packet is granted consent, and the local request table is updated accordingly. And wherein, whether the requested reservation slot indicated by the slot request information of the sender of the HELLO packet collides with the locally requested reservation slot may further be judged; if they collide, it may be determined that the locally requested reservation slot is invalid, and the local reservation history information is updated accordingly; and if they do not collide, it may be determined that the locally requested reservation slot is valid, and the local reservation history information is accordingly kept unchanged.

In another embodiment, the processing unit 123 further includes:

a second traversing module 1233 configured to traverse each information entry of the RES part of the HELLO packet, i.e. slot request information of each neighbor node of the sender of the HELLO packet; and a second processing module 1234 configured to determine whether the reservation slot requested by the local node is valid according to a information entry of a local source ID being the ID of the local node in the information entries, and update the local request table according to the information entries of a local source ID being not the ID of the local node in the information entries.

Wherein, if confirmation information of the information entry of a local source ID being the ID of the local node is consent, the reservation slot requested by the local node is determined as being valid; otherwise, the reservation slot requested by the local node is determined as being invalid, and the local reservation history information is updated.

Wherein, if confirmation information of the information entry of a local source ID being not the ID of the local node is consent, the local request table is updated when the local source ID of the information entry is the ID of a one-hop neighbor node of the local node, and an information entry of a one-hop neighbor node in the local request table is updated when the local source ID of the information entry is not the ID of a one-hop neighbor node of the local node; and if the confirmation information of the information entry of a local source ID being not the ID of the local node is objection, the local request table is updated accordingly.

With the node of the embodiment of the present invention, when the timer of a HELLO packet is started, the node constructs a HELLO packet including a REQ part (slot information requested by itself) or including a REQ part (slot information requested by itself) and a RES part (slot information requested by a neighbor node of itself), and transmits the HELLO packet in a broadcast manner, so that a node receiving the HELLO packet accordingly determines whether a reservation slot requested by it is valid, and/or updates its local request table, and/or constructs its HELLO packet when a timer of its HELLO packet is started, etc., thereby effectively achieving efficient assignment of slots, avoiding data collision, and being more applicable to various multi-hop networks.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

For the implementation of the present invention containing the above embodiments, following supplements are further disclosed.

Supplement 1. A method for assigning slot, including:

constructing a HELLO packet, the HELLO packet including slot request information of a local node or including slot request information of a local node and slot request information of at least one neighbor node of the local node; and transmitting the HELLO packet, so that a node receiving the HELLO packet authenticates a reservation slot requested by the local node according to the slot request information;

wherein, the slot request information of the local node includes an address of the local node, an address of a receiving node of a data packet to be transmitted by the local node and an index of the reservation slot requested by the local node; and the slot request information of the neighbor node includes an address of the neighbor node, an address of a receiving node of a data packet to be transmitted by the neighbor node, an index of a reservation slot requested by the neighbor node, and confirmation information of the reservation slot requested by the neighbor node.

Supplement 2. The method according to supplement 1, wherein the step of constructing a HELLO packet includes:

selecting the receiving node of the data packet to be transmitted by the local node from a routing table to obtain the address of the receiving node of the data packet to be transmitted by the local node;

selecting the reservation slot for the data packet to be transmitted by the local node to obtain the index of the reservation slot requested by the local node; and obtaining slot request information of the local node according to the address of the receiving node of the data packet to be transmitted by the local node, the index of the reservation slot requested by the local node and the address of the local node.

Supplement 3. The method according to supplement 2, wherein the step of constructing a HELLO packet further includes:

selecting an information entry of the at least one neighbor node from a local request table according to a predetermined policy, and taking the information entry as the slot request information of the at least one neighbor node.

Supplement 4. The method according to supplement 2, wherein the step of selecting the reservation slot for the data packet to be transmitted by the local node includes:

determining whether a reservation slot previously requested by the local node is valid according to local reservation history information;

taking the reservation slot previously requested by the local node as the reservation slot when the reservation slot previously requested by the local node is valid; and selecting randomly an unused slot from a preconfigured slot set as the reservation slot, or selecting a first unused slot from a preconfigured slot set as the reservation slot, or selecting a slot at a middle position within a maximum unused slot interval from a preconfigured slot set as the reservation slot, or selecting a slot with a slot index being a function of the address of the local node from a preconfigured slot set as the reservation slot, or selecting an unused slot from a slot set to which a hop count of the local node corresponds as the reservation slot according to the hop count of the local node, when the reservation slot previously requested by the local node is invalid.

Supplement 5. The method according to supplement 4, wherein the preconfigured slot set is a data part of a designated frame in a preset HELLO packet interval, or data parts of all frames in a preset HELLO packet interval.

Supplement 6. The method according to supplement 1, wherein the method further includes:

authenticating a reservation slot requested by a sender of a received HELLO packet, and/or determining whether the reservation slot requested by the local node is valid, and/or updating a local request table, and/or updating local reservation history information, according to the received HELLO packet;

wherein the received HELLO packet includes slot request information of the sender of the received HELLO packet, or includes slot request information of the sender of the received HELLO packet and slot request information of at least one neighbor node of the sender of the received HELLO packet.

Supplement 7. The method according to supplement 6, wherein if the received HELLO packet contains only the slot request information of the sender of the HELLO packet, after receiving the HELLO packet, the method further includes:

traversing the slot request information of the sender of the received HELLO packet in the received HELLO packet; and comparing the slot request information of the sender of the received HELLO packet in the received HELLO packet with information entries with confirmation information being consent in the local request table;

if a requested reservation slot indicated by the slot request information of the sender of the received HELLO packet collides with a requested reservation slot indicated by a information entry with confirmation information being consent in the local request table, granting objection to the reservation slot requested by the sender of the received HELLO packet and adding an information entry corresponding to the slot request information of the sender of the received HELLO packet into the local request table; and if the requested reservation slot indicated by the slot request information of the sender of the received HELLO packet does not collide with requested reservation slots indicated by the information entries with confirmation information being consent in the local request table, granting consent to the reservation slot requested by the sender of the received HELLO packet and adding an information entry corresponding to the slot request information of the sender of the received HELLO packet into the local request table.

Supplement 8. The method according to supplement 7, wherein if the requested reservation slot indicated by the slot request information of the sender of the received HELLO packet does not collide with the requested reservation slots indicated by the information entries with confirmation information being consent in the local request table, the method further includes:

judging whether the requested reservation slot indicated by the slot request information of the sender of the received HELLO packet collides with the reservation slot requested by the local node;

if they collide, determining that the reservation slot requested by the local node is invalid and updating local reservation history information; and if they do not collide, determining that the reservation slot requested by the local node is valid and keeping the local reservation history information unchanged.

Supplement 9. The method according to supplement 7, wherein if the received HELLO packet further contains the slot request information of the at least one neighbor node of the sender of the HELLO packet, before traversing the slot request information of the sender of the received HELLO packet, the method further includes:

traversing each piece of slot request information in the slot request information of the at least one neighbor node of the sender of the received HELLO packet in the received HELLO packet;

determining whether the reservation slot requested by the local node is valid according to the confirmation information indicated by the slot request information if local source ID indicated by the slot request information is the ID of the local node; and updating the local request table according to the confirmation information indicated by the slot request information if the local source ID indicated by the slot request information is not the ID of the local node.

Supplement 10. The method according to supplement 9, wherein the step of determining whether the reservation slot requested by the local node is valid according to the confirmation information indicated by the slot request information includes:

determining that the reservation slot requested by the local node is valid if the acknowledgment information indicated by the slot request information is consent, and updating the local reservation history information accordingly;

determining that the reservation slot requested by the local node is invalid if the acknowledgment information indicated by the slot request information is objection.

Supplement 11. The method according to supplement 9, wherein the step of updating the local request table according to the confirmation information indicated by the slot request information includes:

updating directly the local request table according to the acknowledgment information indicated by the slot request information if the acknowledgment information indicated by the slot request information is objection; and judging whether the local source ID indicated by the slot request information is the ID of one hop neighbor node of the local node if the acknowledgment information indicated by the slot request information is consent, if yes, directly updating the local request table accordingly, and if no, updating accordingly information entry of one hop neighbor node in the local request table.

Supplement 12. The method according to supplement 11, wherein the step of updating the information entry of the one hop neighbor node in the local request table includes:

modifying the confirmation information indicated by the information entry of the one hop neighbor node in the local request table into being invalid if the slot index indicated by the information entry of the one hop neighbor node in the local request table is identical to the slot index indicated by the slot request information; and keeping the information entry of the one hop neighbor node in the local request table unchanged if the slot index indicated by the information entry of the one hop neighbor node in the local request table is different from the slot index indicated by the slot request information.

The invention claimed is:

1. A node in a multi-hop network, comprising:
a memory; and
a processor coupled to the memory and configured to execute processes including:
constructing a HELLO packet, the HELLO packet comprising slot request information of a local node and slot request information of at least one neighbor node of the local node; and
transmitting the HELLO packet, so that a node receiving the HELLO packet authenticates a reservation slot requested by the node according to the slot request information,
wherein the slot request information of the local node comprises an address of the local node, an address of a receiving node of a data packet to be transmitted by the local node and an index of a reservation slot requested by the local node; and the slot request information of the neighbor node comprises an address of the neighbor node, an address of a receiving node of a data packet to be transmitted by the neighbor node, an index of a reservation slot requested by the neighbor node, and confirmation information of the reservation slot requested by the neighbor node.

2. The node according to claim 1, wherein the processor is configured to execute processes including:
obtaining the address of the receiving node of the data packet to be transmitted by the local node by selecting the receiving node of the data packet to be transmitted by the local node from a routing table;
obtaining the index of the reservation slot requested by the local node by selecting the reservation slot for the data packet to be transmitted by the local node; and
constructing the slot request information of the local node in the HELLO packet according to the address of the receiving node of the data packet to be transmitted by the local node, the index of the reservation slot requested by the local node and the address of the local node.

3. The node according to claim 2, wherein the processor is further configured to execute processes including:
selecting an information entry of the at least one neighbor node from a local request table according to a predetermined policy if the local request table is not empty, and taking the information entry as the slot request information of the at least one neighbor node of the local node; and
constructing the slot request information of the at least one neighbor node of the local node in the HELLO packet according to the slot request information of the at least one neighbor node of the local node.

4. The node according to claim 2, wherein the processor is configured to execute processes including:

determining whether a reservation slot previously requested by the local node is valid according to reservation history information;
taking the reservation slot previously requested by the local node as the reservation slot when the reservation slot previously requested by the node is valid; and
randomly selecting an unused slot from a preconfigured slot set as the reservation slot, or select a first unused slot from a preconfigured slot set as the reservation slot, or selecting a slot at a middle position within a maximum unused slot interval from a preconfigured slot set as the reservation slot, or selecting a slot with a slot index being a function of the address of the local node from a preconfigured slot set as the reservation slot, or selecting an unused slot from a slot set to which a hop count of the local node corresponds as the reservation slot according to the hop count of the local node, when the reservation slot previously requested by the node is invalid.

5. The node according to claim 1, wherein the processor is further configured to execute processes including:
authenticating a reservation slot requested by a sender of a received HELLO packet, and/or determining whether the reservation slot requested by the local node is valid, and/or updating a local request table, and/or updating local reservation history information, according to the received HELLO packet;
wherein the received HELLO packet comprises slot request information of the sender of the received HELLO packet, or comprises slot request information of the sender of the received HELLO packet and slot request information of at least one neighbor node of the sender of the received HELLO packet.

6. The node according to claim 5, wherein the processor is configured to execute processes including:
traversing the slot request information of the sender of the received HELLO packet in the received HELLO packet; and
comparing the slot request information of the sender of the received HELLO packet in the received HELLO packet with information entries with confirmation information being consent in the local request table, if a requested reservation slot indicated by the slot request information of the sender of the received HELLO packet collides with a requested reservation slot indicated by a information entry with confirmation information being consent in the local request table, granting objection to the reservation slot requested by the sender of the received HELLO packet and adding an information entry corresponding to the slot request information of the sender of the received HELLO packet into the local request table, and if the requested reservation slot indicated by the slot request information of the sender of the received HELLO packet does not collide with the requested reservation slots indicated by the information entries with confirmation information being consent in the local request table, granting consent to the reservation slot requested by the sender of the received HELLO packet and adding an information entry corresponding to the slot request information of the sender of the received HELLO packet into the local request table.

7. The node according to claim 6, wherein the processor is further configured to execute processes including:
judging whether the requested reservation slot indicated by the slot request information of the sender of the received HELLO packet collides with the reservation slot requested by the local node when the requested reservation slot indicated by the slot request information of the sender of the received HELLO packet does not collide with the requested reservation slots indicated by the information entries with confirmation information being consent in the local request table, if they collide, determining that the reservation slot requested by the local node is invalid and updating local reservation history information, and if they do not collide, determining that the reservation slot requested by the local node is valid and keeping the local reservation history information unchanged.

8. The node according to claim 6, wherein the processor is further configured to execute processes including:

traversing each piece of slot request information in the slot request information of the at least one neighbor node of the sender of the received HELLO packet in the received HELLO packet; and determining whether the reservation slot requested by the local node is valid according to the confirmation information indicated by the slot request information when local source ID indicated by the slot request information is the ID of the local node, and updating the local request table according to the confirmation information indicated by the slot request information when the local source ID indicated by the slot request information is not the ID of the local node.

9. The node according to claim 8, wherein:

the processor determines that the reservation slot requested by the local node is valid if the acknowledgment information indicated by the slot request information is consent, and determines that the reservation slot requested by the local node is invalid and update the local reservation history information if the acknowledgment information indicated by the slot request information is objection, in determining whether the reservation slot requested by the local node is valid according to the acknowledgment information indicated by the slot request information;

and the processor directly updates the local request table according to the acknowledgment information indicated by the slot request information if the acknowledgment information indicated by the slot request information is objection, and judges whether the local source ID indicated by the slot request information is the ID of one hop neighbor node of the local node if the acknowledgment information indicated by the slot request information is consent, if yes, directly updates the local request table according to the acknowledgment information, and if no, updates information entry of one hop neighbor node in the local request table, in updating the local request table according to the acknowledgment information indicated by the slot request information.

10. A method for assigning slot, comprising:

constructing a HELLO packet, the HELLO packet comprising slot request information of a local node and slot request information of at least one neighbor node of the local node; and transmitting the HELLO packet, so that a node receiving the HELLO packet authenticates a reservation slot requested by a sender of the HELLO packet according to the slot request information;

wherein, the slot request information of the local node comprises an address of the local node, an address of a receiving node of a data packet to be transmitted by the local node and an index of a reservation slot requested by the local node; and the slot request information of the neighbor node comprises an address of the neighbor node, an address of a receiving node of a data packet to be transmitted by the neighbor node, an index of a reservation slot requested by the neighbor node, and confirmation information of the reservation slot requested by the neighbor node.

11. The method according to claim 10, wherein the step of constructing a HELLO packet includes:

selecting the receiving node of the data packet to be transmitted by the local node from a routing table to obtain the address of the receiving node of the data packet to be transmitted by the local node;

selecting the reservation slot for the data packet to be transmitted by the local node to obtain the index of the reservation slot requested by the local node; and obtaining slot request information of the local node according to the address of the receiving node of the data packet to be transmitted by the local node, the index of the reservation slot requested by the local node and the address of the local node.

12. The method according to supplement 11, wherein the step of constructing a HELLO packet further includes:

selecting an information entry of the at least one neighbor node from a local request table according to a predetermined policy, and taking the information entry as the slot request information of the at least one neighbor node.

13. The method according to supplement 11, wherein the step of selecting the reservation slot for the data packet to be transmitted by the local node includes:

determining whether a reservation slot previously requested by the local node is valid according to local reservation history information;

taking the reservation slot previously requested by the local node as the reservation slot when the reservation slot previously requested by the local node is valid; and selecting randomly an unused slot from a preconfigured slot set as the reservation slot, or selecting a first unused slot from a preconfigured slot set as the reservation slot, or selecting a slot at a middle position within a maximum unused slot interval from a preconfigured slot set as the reservation slot, or selecting a slot with a slot index being a function of the address of the local node from a preconfigured slot set as the reservation slot, or selecting an unused slot from a slot set to which a hop count of the local node corresponds as the reservation slot according to the hop count of the local node, when the reservation slot previously requested by the local node is invalid.

14. The method according to supplement 10, wherein the method further includes:

authenticating a reservation slot requested by a sender of a received HELLO packet, and/or determining whether the reservation slot requested by the local node is valid, and/or updating a local request table, and/or updating local reservation history information, according to the received HELLO packet;

wherein the received HELLO packet includes slot request information of the sender of the received HELLO packet, or includes slot request information of the sender of the received HELLO packet and slot request information of at least one neighbor node of the sender of the received HELLO packet.

15. The method according to supplement 14, wherein if the received HELLO packet contains only the slot request information of the sender of the HELLO packet, after receiving the HELLO packet, the method further includes:

- traversing the slot request information of the sender of the received HELLO packet in the received HELLO packet; and
- comparing the slot request information of the sender of the received HELLO packet in the received HELLO packet with information entries with confirmation information being consent in the local request table;
- if a requested reservation slot indicated by the slot request information of the sender of the received HELLO packet collides with a requested reservation slot indicated by a information entry with confirmation information being consent in the local request table, granting objection to the reservation slot requested by the sender of the received HELLO packet and adding an information entry corresponding to the slot request information of the sender of the received HELLO packet into the local request table; and
- if the requested reservation slot indicated by the slot request information of the sender of the received HELLO packet does not collide with requested reservation slots indicated by the information entries with confirmation information being consent in the local request table, granting consent to the reservation slot requested by the sender of the received HELLO packet and adding an information entry corresponding to the slot request information of the sender of the received HELLO packet into the local request table.

16. The method according to supplement 15, wherein if the requested reservation slot indicated by the slot request information of the sender of the received HELLO packet does not collide with the requested reservation slots indicated by the information entries with confirmation information being consent in the local request table, the method further includes:

- judging whether the requested reservation slot indicated by the slot request information of the sender of the received HELLO packet collides with the reservation slot requested by the local node;
- if they collide, determining that the reservation slot requested by the local node is invalid and updating local reservation history information; and
- if they do not collide, determining that the reservation slot requested by the local node is valid and keeping the local reservation history information unchanged.

17. The method according to supplement 15, wherein if the received HELLO packet further contains the slot request information of the at least one neighbor node of the sender of the HELLO packet, before traversing the slot request information of the sender of the received HELLO packet, the method further includes:

- traversing each piece of slot request information in the slot request information of the at least one neighbor node of the sender of the received HELLO packet in the received HELLO packet;
- determining whether the reservation slot requested by the local node is valid according to the confirmation information indicated by the slot request information if local source ID indicated by the slot request information is the ID of the local node; and
- updating the local request table according to the confirmation information indicated by the slot request information if the local source ID indicated by the slot request information is not the ID of the local node.

18. The method according to supplement 17, wherein the step of determining whether the reservation slot requested by the local node is valid according to the confirmation information indicated by the slot request information includes:

- determining that the reservation slot requested by the local node is valid if the acknowledgment information indicated by the slot request information is consent, and updating the local reservation history information accordingly;
- determining that the reservation slot requested by the local node is invalid if the acknowledgment information indicated by the slot request information is objection.

19. The method according to supplement 17, wherein the step of updating the local request table according to the confirmation information indicated by the slot request information includes:

- updating directly the local request table according to the acknowledgment information indicated by the slot request information if the acknowledgment information indicated by the slot request information is objection; and
- judging whether the local source ID indicated by the slot request information is the ID of one hop neighbor node of the local node if the acknowledgment information indicated by the slot request information is consent, if yes, directly updating the local request table accordingly, and if no, updating accordingly information entry of one hop neighbor node in the local request table.

20. The method according to supplement 19, wherein the step of updating the information entry of the one hop neighbor node in the local request table includes:

- modifying the confirmation information indicated by the information entry of the one hop neighbor node in the local request table into being invalid if the slot index indicated by the information entry of the one hop neighbor node in the local request table is identical to the slot index indicated by the slot request information; and
- keeping the information entry of the one hop neighbor node in the local request table unchanged if the slot index indicated by the information entry of the one hop neighbor node in the local request table is different from the slot index indicated by the slot request information.

* * * * *